Figure 1:
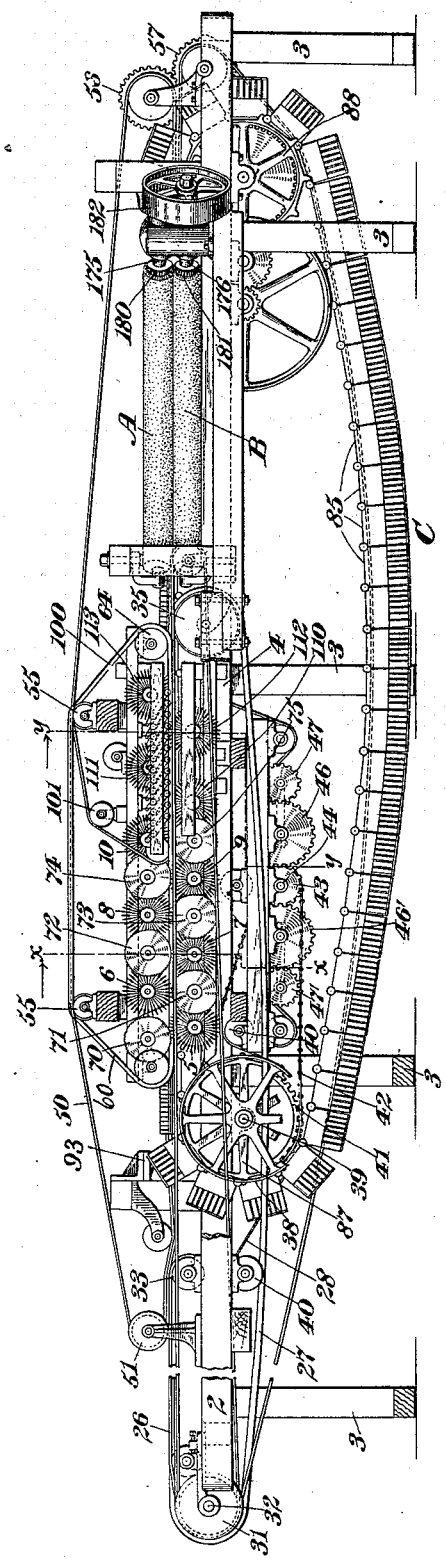

No. 615,248. Patented Dec. 6, 1898.
G. P. & W. H. BUTLER.
MACHINE FOR STEMMING TOBACCO LEAVES.
(Application filed Oct. 22, 1897.)
(No Model.) 12 Sheets—Sheet 1.

Witnesses:
J. L. Edwards Jr.
Fred J. Dole.

Inventors:
George P. Butler,
William H. Butler.
By their Attorney,
F. A. Richards.

No. 615,248. Patented Dec. 6, 1898.
G. P. & W. H. BUTLER.
MACHINE FOR STEMMING TOBACCO LEAVES.
(Application filed Oct. 22, 1897.)

(No Model.) 12 Sheets—Sheet 2.

Witnesses:
J. L. Edwards Jr.
Fred. J. Dole

Inventors:
George P. Butler,
William H. Butler.
By their Attorney,
F. H. Richards.

No. 615,248. Patented Dec. 6, 1898.
G. P. & W. H. BUTLER.
MACHINE FOR STEMMING TOBACCO LEAVES.
(Application filed Oct. 22, 1897.)

(No Model.) 12 Sheets—Sheet 3.

Witnesses:
J. L. Edwards Jr.
Fred. J. Dole.

Inventors:
George P. Butler,
William H. Butler.
By their Attorney,
S. H. Richards.

No. 615,248. Patented Dec. 6, 1898.
G. P. & W. H. BUTLER.
MACHINE FOR STEMMING TOBACCO LEAVES.
(Application filed Oct. 22, 1897.)

(No Model.) 12 Sheets—Sheet 4.

Witnesses:
J. L. Edwards Jr.
Fred. J. Dole.

Inventors:
George P. Butler,
William H. Butler.
By their Attorney,
F. H. Richards.

No. 615,248. Patented Dec. 6, 1898.
G. P. & W. H. BUTLER.
MACHINE FOR STEMMING TOBACCO LEAVES.
(Application filed Oct. 22, 1897.)
(No Model.) 12 Sheets—Sheet 5.

Witnesses:
J. L. Edwards Jr.
Fred. J. Dole.

Inventors:
George P. Butler.
William H. Butler.
By their Attorney,
F. H. Richards.

No. 615,248. Patented Dec. 6, 1898.
G. P. & W. H. BUTLER.
MACHINE FOR STEMMING TOBACCO LEAVES.
(Application filed Oct. 22, 1897.)
(No Model.) 12 Sheets—Sheet 6.

Witnesses:
J. L. Edwards Jr.
Fred. J. Dole.

Inventors:
George P. Butler,
William H. Butler,
By his Attorney,
F. H. Richards.

THE NORRIS PETERS CO., PHOTO-LITHO., WASHINGTON, D. C.

No. 615,248. Patented Dec. 6, 1898.
G. P. & W. H. BUTLER.
MACHINE FOR STEMMING TOBACCO LEAVES.
(Application filed Oct. 22, 1897.)
(No Model.) 12 Sheets—Sheet 8.

Witnesses:
J. L. Edwards Jr.
Fred. J. Dole.

Inventors:
George P. Butler,
William H. Butler.
By their Attorney,
F. H. Richards.

THE NORRIS PETERS CO., PHOTO-LITHO., WASHINGTON, D. C.

No. 615,248. Patented Dec. 6, 1898.
G. P. & W. H. BUTLER.
MACHINE FOR STEMMING TOBACCO LEAVES.
(Application filed Oct. 22, 1897.)
(No Model.) 12 Sheets—Sheet 9.
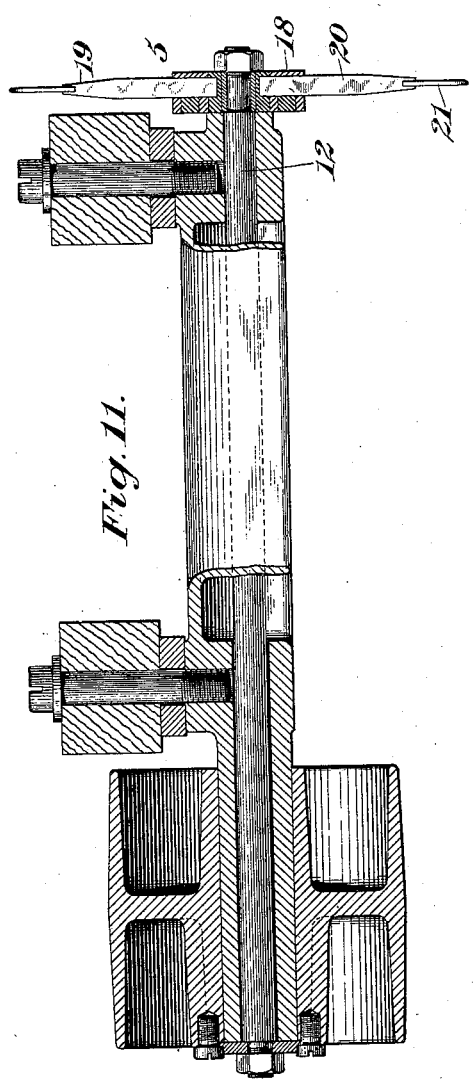
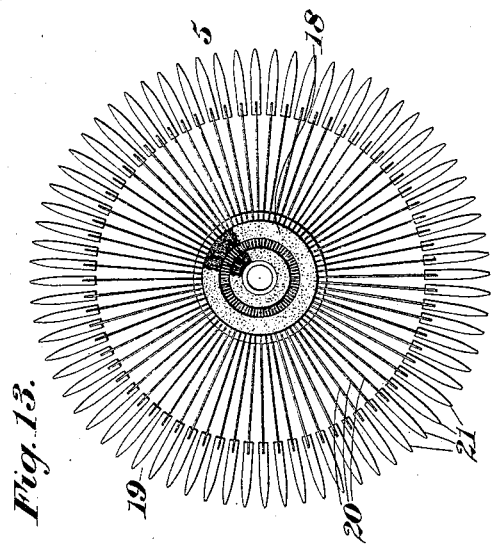
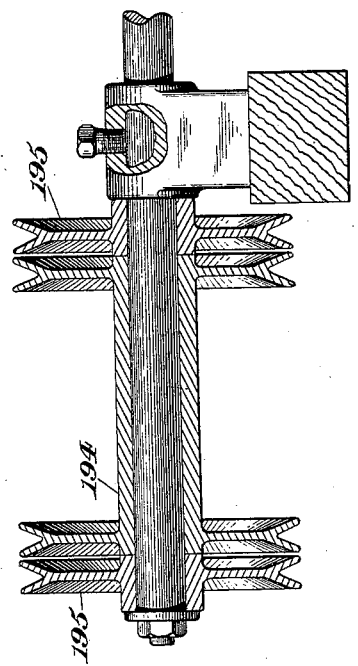
Witnesses:
J. L. Edwards Jr.
Fred. J. Dole.
Inventors:
George P. Butler,
William H. Butler.
By their Attorney,
J. H. Richards.

No. 615,248. Patented Dec. 6, 1898.
G. P. & W. H. BUTLER.
MACHINE FOR STEMMING TOBACCO LEAVES.
(Application filed Oct. 22, 1897.)
(No Model.) 12 Sheets—Sheet 10.
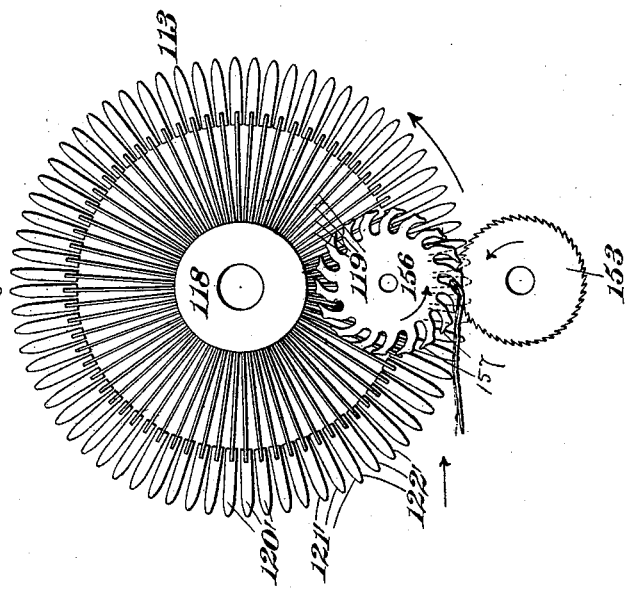
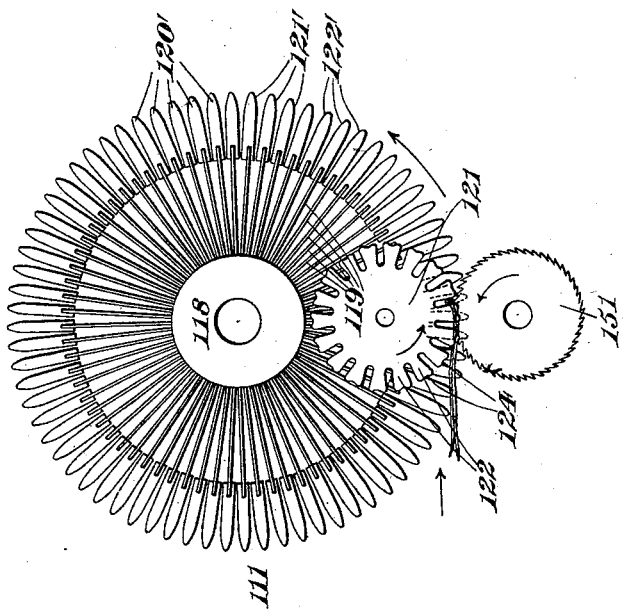
Witnesses:
J. L. Edwards Jr.
Fred. J. Dole.
Inventors:
George P. Butler,
William H. Butler.
By their Attorney,
F. H. Richards.

No. 615,248. Patented Dec. 6, 1898.
G. P. & W. H. BUTLER.
MACHINE FOR STEMMING TOBACCO LEAVES.
(Application filed Oct. 22, 1897.)

(No Model.) 12 Sheets—Sheet 11.

Witnesses:
J. L. Edwards Jr.
Fred. J. Dole.

Inventors:
George P. Butler,
William H. Butler.
By their Attorney,
J. H. Richards.

No. 615,248. Patented Dec. 6, 1898.
G. P. & W. H. BUTLER.
MACHINE FOR STEMMING TOBACCO LEAVES.
(Application filed Oct. 22, 1897.)

(No Model.) 12 Sheets—Sheet 12.

Witnesses:
J. L. Edwards Jr.
Fred. J. Dole.

Inventors:
George P. Butler,
William H. Butler.
By their Attorney,
J. W. Richards.

UNITED STATES PATENT OFFICE.

GEORGE P. BUTLER AND WILLIAM H. BUTLER, OF HARRISON, NEW YORK.

MACHINE FOR STEMMING TOBACCO-LEAVES.

SPECIFICATION forming part of Letters Patent No. 615,248, dated December 6, 1898.

Application filed October 22, 1897. Serial No. 656,057. (No model.)

*To all whom it may concern:*

Be it known that we, GEORGE P. BUTLER and WILLIAM H. BUTLER, citizens of the United States, residing at Harrison, in the county of Westchester and State of New York, have invented certain new and useful Improvements in Machines for Stemming Tobacco-Leaves, of which the following is a specification.

This invention relates to devices for stemming tobacco-leaves.

Our invention includes, broadly, as one of its features any devices for incising the web of a leaf between its ends and for detaching that part of the web located between the line of incision and the end of the leaf. The leaf to be treated is supplied either by hand or mechanically to means which preferably grip and advance it to the incising mechanism, which parts the web or lamina without cutting or otherwise injuring the stem—that is to say, the blade and veins which constitute the web of the leaf are incised. After the web is incised the leaf is conducted to the stemming mechanism, which detaches or strips from the stem that part of the web located between the line of incision and the end of the leaf, and the stem not having been injured in the prior treatment this operation is performed with facility and without the risk of unevenly tearing the web, the line of separation closely following the stem. After the web is thus stripped by the machine from the stem the latter is severed close to the place at which the transverse incision was primarily made in the leaf, and although this last-mentioned operation may be done by hand mechanism automatically coöperative with the incising and stemming means is provided in the machine for this purpose.

Another feature of our invention resides in mechanisms for forming in the leaf a multiplicity of punctures to produce an incision or cut in the web of the leaf and for severing the veins lying across the cut. In the present case these punctures or apertures are formed in alinement transversely in the leaf, and we prefer to employ, in connection with the leaf-puncturing and vein-severing means, mechanism operable to engage a vein or veins lying across the incision made in the leaf by the puncturing mechanism and to force said vein or veins into contact with the vein-severing means.

Figure 2:
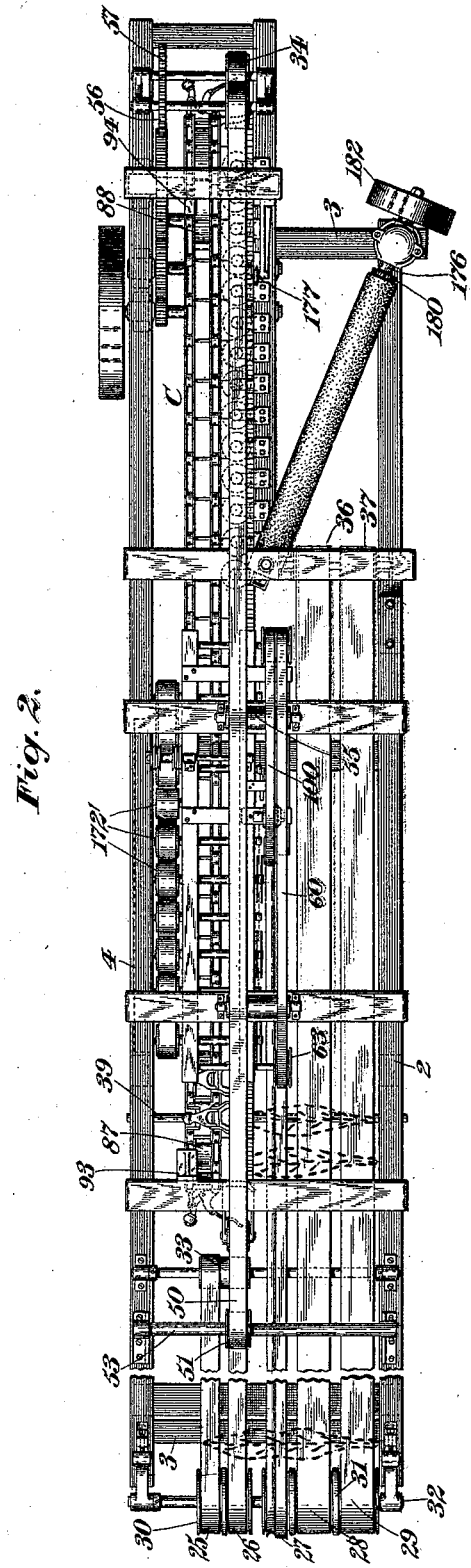
Figure 3:
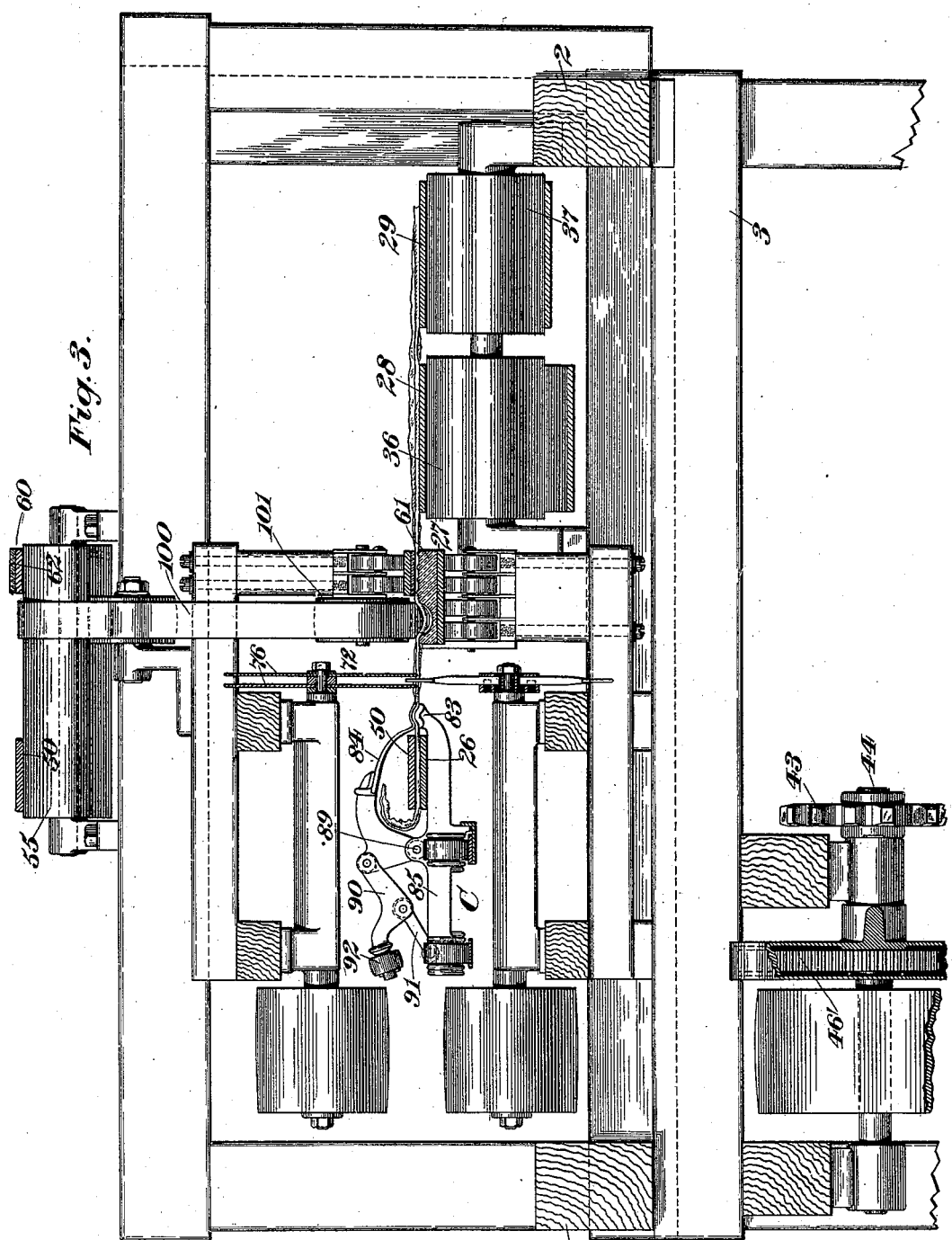
Figure 4:
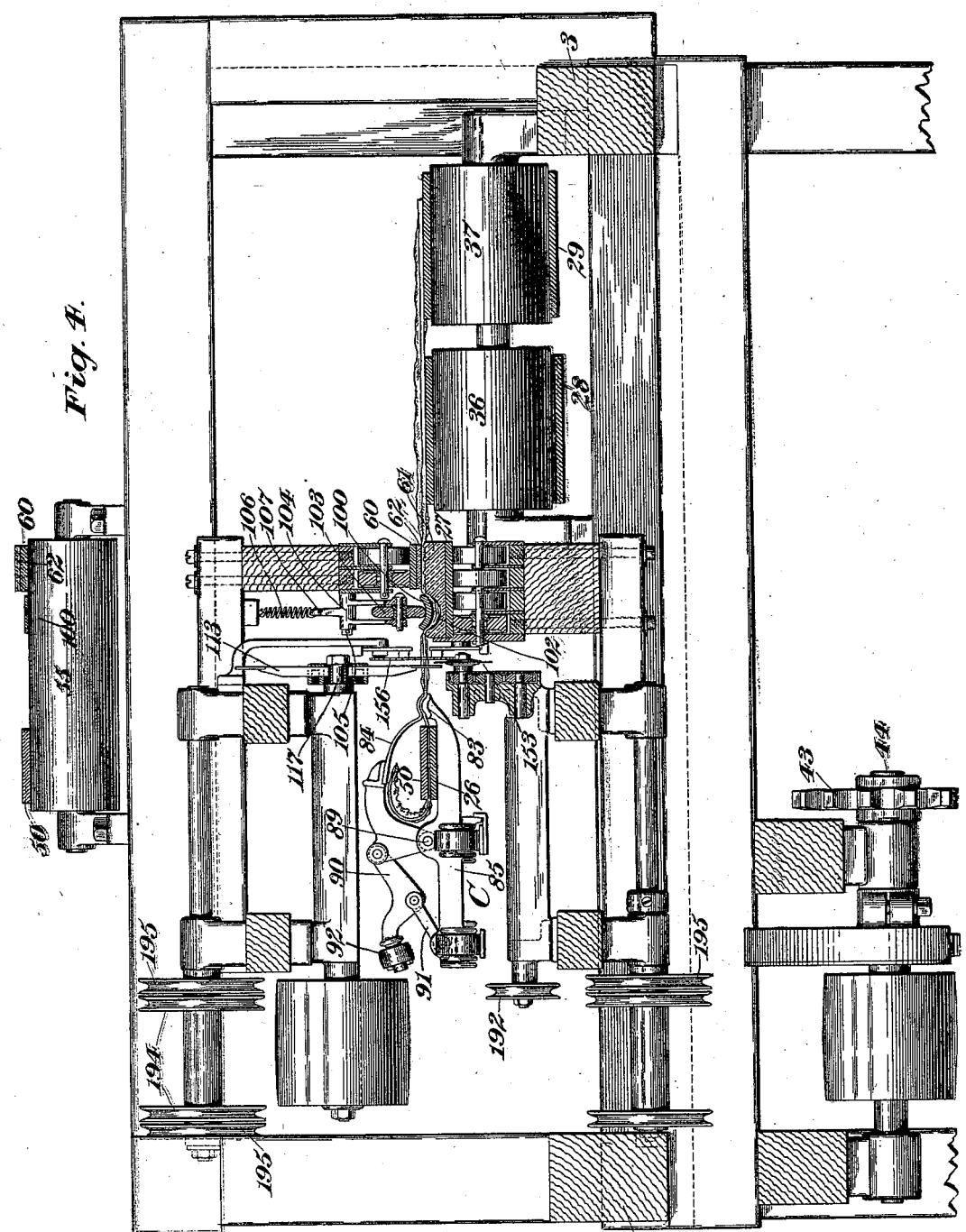
Figure 5:
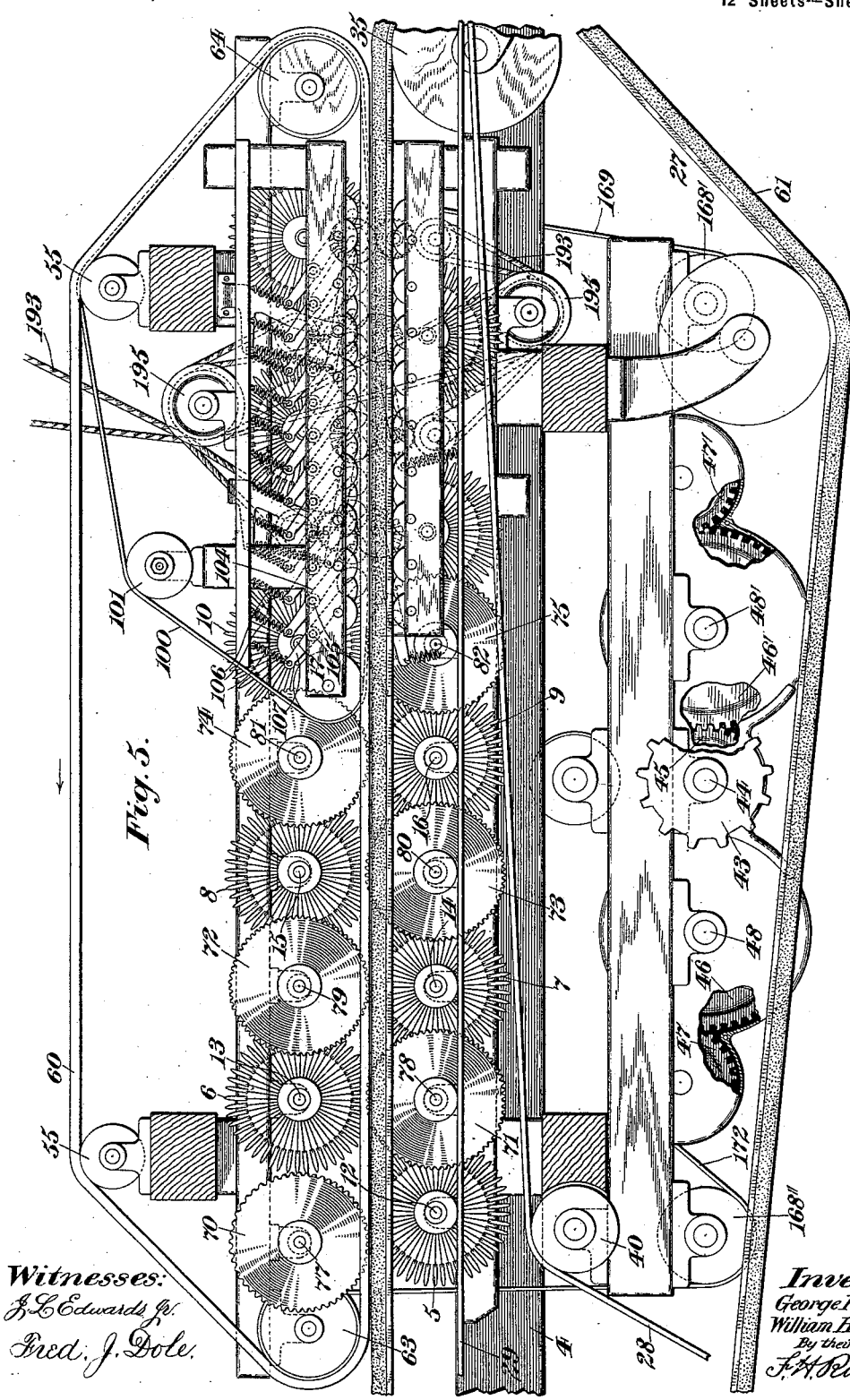
Figure 6:
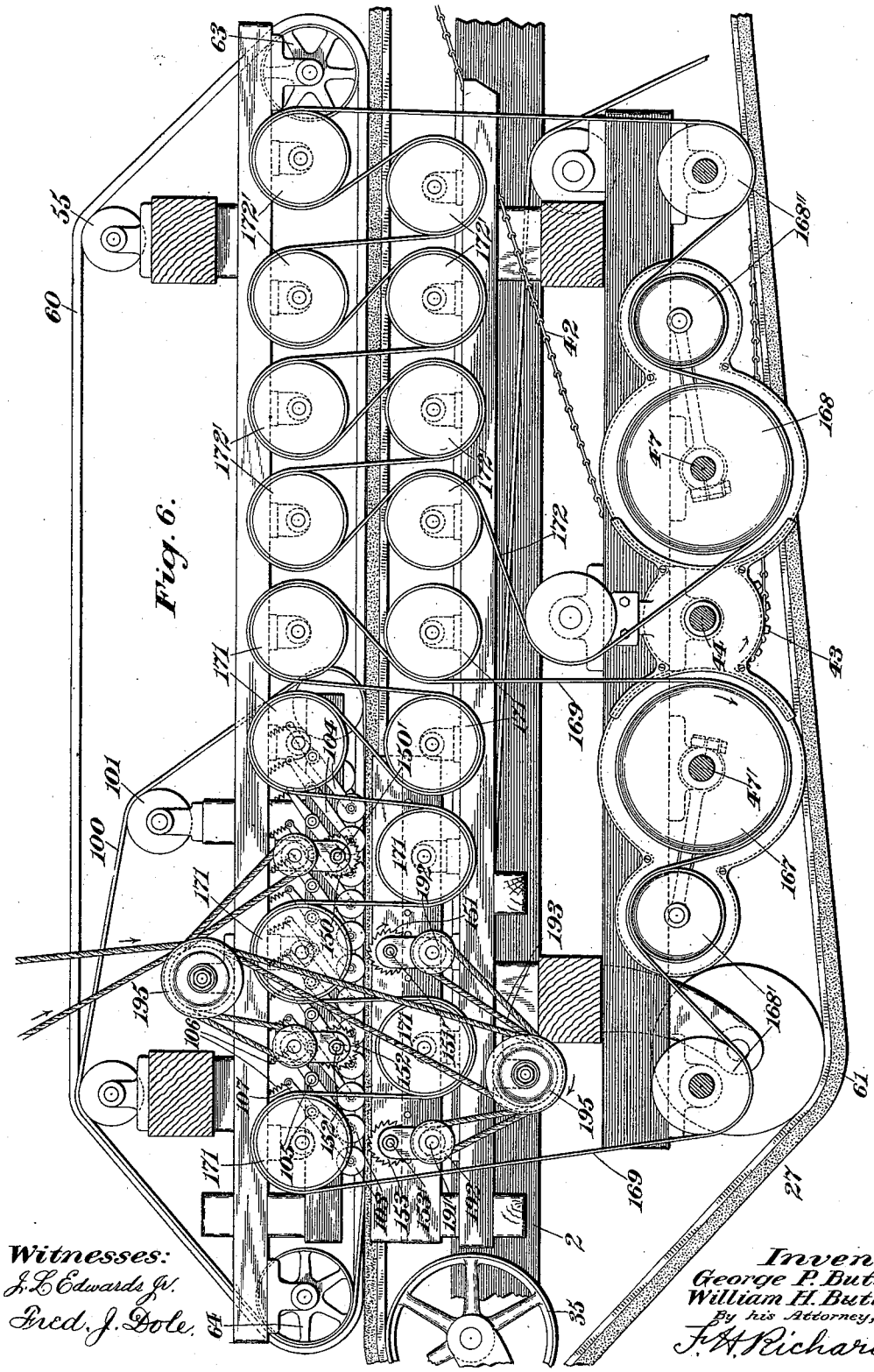
Figure 7:
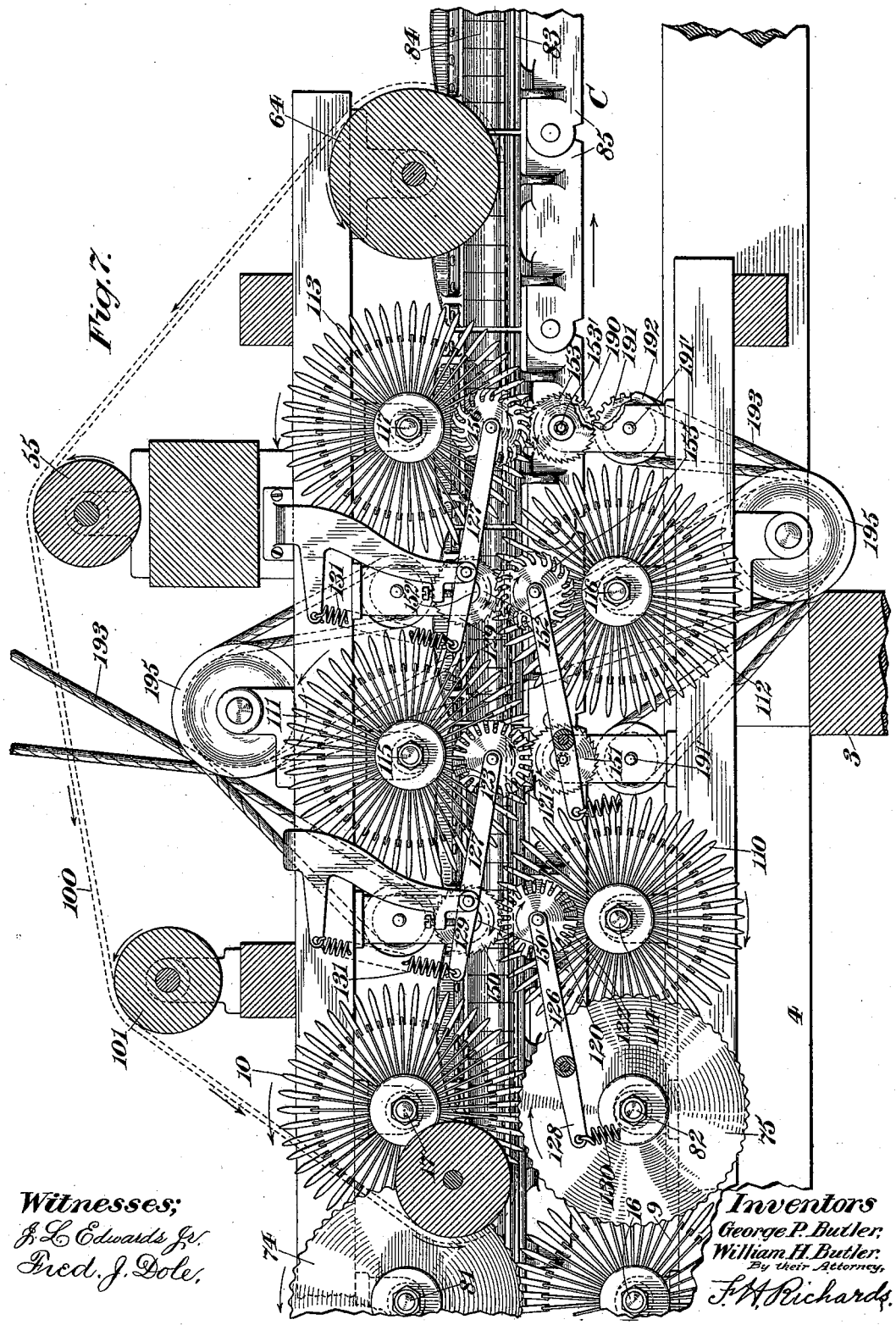
Figure 8:
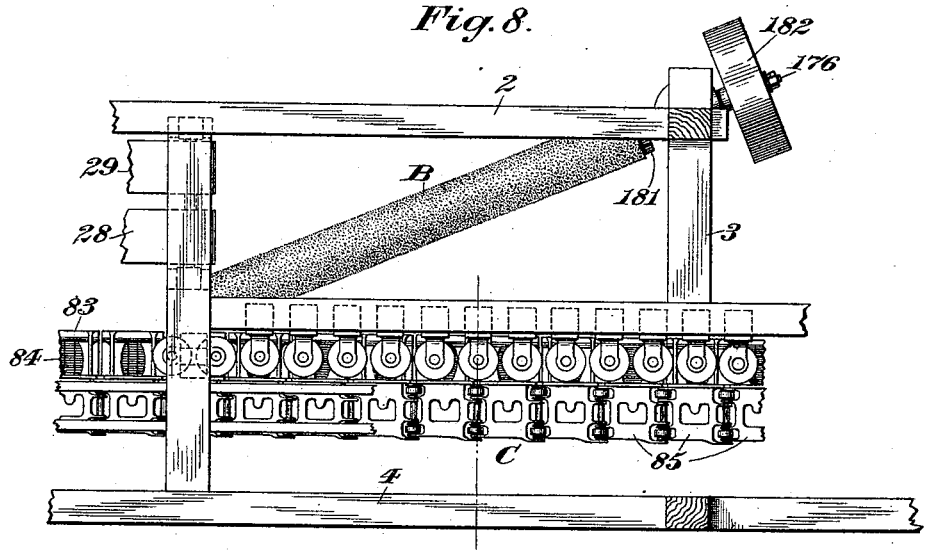
Figure 9:
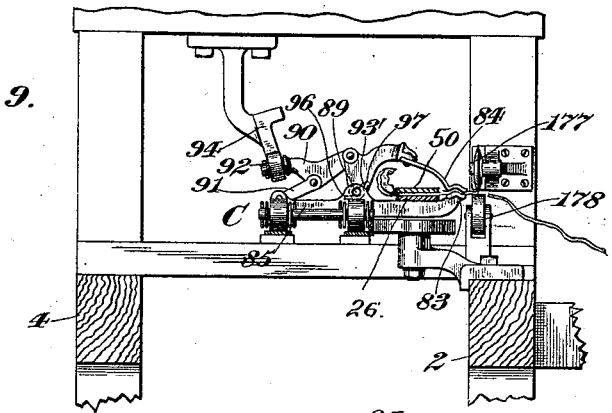
Figure 10:
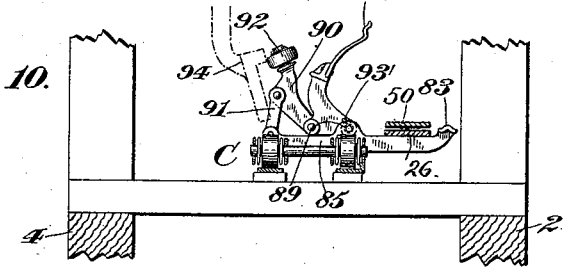
Figure 16:
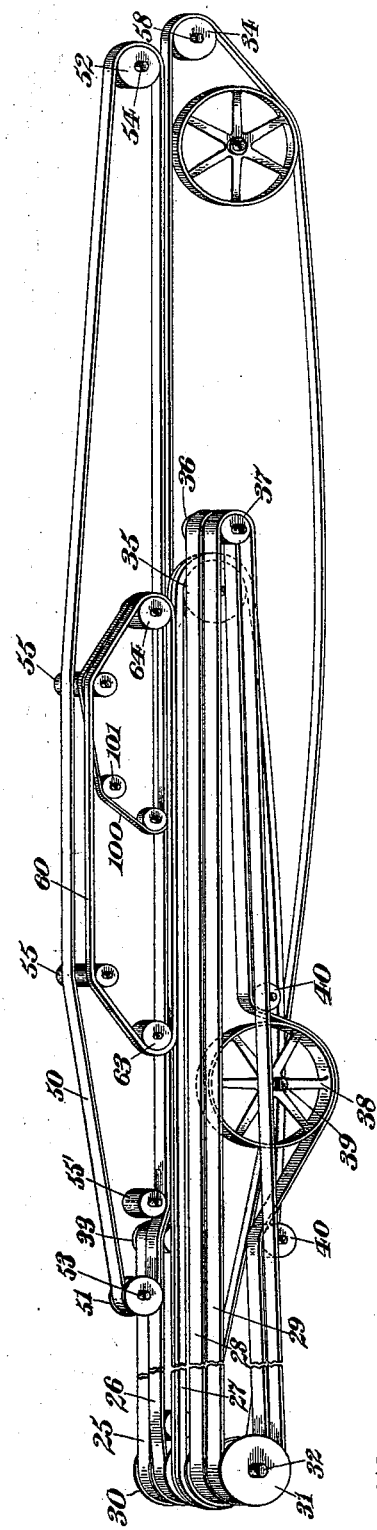
Figure 17:
Figure 18:
Figure 19:
Figure 20:
Figure 21:
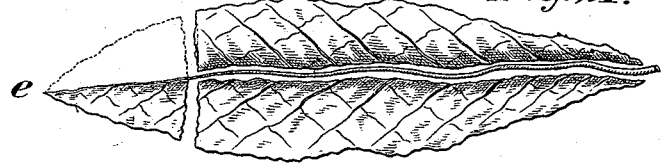
Figure 22:
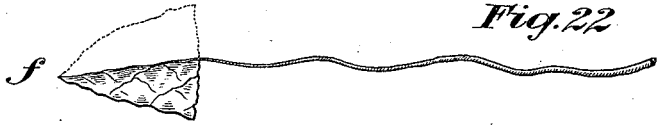
Figure 23:

In the drawings accompanying and forming part of this specification, Figure 1 is a side elevation of our improved tobacco-stemming machine. Fig. 2 is a plan view of the same. Figs. 3 and 4 are transverse sections, on an enlarged scale, taken in the line $xx$ and $yy$, respectively, Fig. 1, and looking in the direction of the arrows. Fig. 5 is a right-hand side elevation, on an enlarged scale, showing the train of leaf-puncturing, vein-deflecting, and vein-severing devices. Fig. 6 is an opposite side elevation of the driving mechanism for operating the devices shown in the preceding views. Fig. 7 is a fragmentary side elevation showing the vein-cutting mechanism. Fig. 8 is an under side view of the stemming mechanism and adjacent parts. Fig. 9 is a sectional view of the leaf-gripping means and knife for cutting the stems, the leaf-gripping jaws being shut. Fig. 10 is a substantially similar view, the leaf-gripping jaws being shown open. Fig. 11 is a sectional elevation of a leaf-puncturing device, its driving means, and intermediate parts. Fig. 12 is a similar view of part of the feed-driving mechanism. Fig. 13 is a side elevation of a leaf-puncturing device. Figs. 14 and 15 are similar views of the vein-deflecting, vein-cutting, and stem-separating devices. Fig. 16 is a perspective view of the several leaf-carrying belts and their driving means. Figs. 17 to 23, inclusive, are views showing the leaf as it is taken from a "hand," illustrating the successive treatments thereof and the separated merchantable stock.

Similar characters designate like parts in all the figures of the drawings.

As hereinbefore stated, our invention relates to the art of stemming leaves; and it consists, first, in means for incising the web of the leaf; second, for detaching that part of the web located between the line of incision and the end of the leaf, and, finally, in means for severing the stem; and it is to be understood that we do not limit our invention to any particular means for practicing this art, as it is apparent that one or all of the steps thereof could be carried out by hand, although we have devised and will hereinafter describe efficient mechanism for expeditiously treating the leaf.

The incising mechanism includes in the present case a series of coöperating vein-deflecting and vein-severing devices, preferably successively effective, and in connection with these devices we prefer to employ vein-deflecting means so constructed as to force a vein or veins lying across an incision in the leaf against or in contact with the vein-severing mechanism. After the leaf has been treated by this set of devices, which form a transverse incision in the web, the leaf is acted upon by the stemming mechanism, which consists, preferably, of a pair of superposed rolls disposed diagonally to the line of travel of the leaf, said rolls being equipped with card-clothing or other material common in this art and having their surfaces running in contact, so that as the leaf is carried past and through the same said rolls can wipe or brush the web from the stem, commencing at the place of incision.

The framework for supporting the various sets of devices may be of any suitable kind. It is shown consisting of the longitudinal beams 2 and 4, joined at intervals by crossbars or braces, each designated by 3.

Puncturing devices disposed in a train and designated, respectively, by 5, 6, 7, 8, 9, and 10 first operate upon the leaf, and notwithstanding six of these devices are represented it is obvious that the number may be increased or diminished to any desired extent, although it is found in practice that the number specified will produce a complete incision, extending entirely across the blade of the leaf, the veins, however, remaining intact. These puncturing devices consist in the present case of wheels disposed in alinement, which are supported for rotation and are adapted to be driven in unison with the leaf-carrying means, so that in action they do not retard or cause that part of the leaf being apertured to lag behind the remainder of said leaf. These puncturing-wheels are carried by the shafts or arbors 12, 13, 14, 15, 16, and 17, supported by suitable bearings on the framework, and each consists of a hub or body portion 18, secured to its shaft in some convenient manner, and a series of puncturing-points or perforators, as 19. Each of these puncturing-points or perforators consists, as shown, of a shank or stem 20, one end of which may be secured in a notch in the perimeter of the hub 18, and a spear or other properly-shaped head 21, secured to the opposite or outer end of said stem. It is to be understood, however, that any suitable puncturing devices may be employed as substitutes for those above described. As a leaf is advanced by the feeding mechanism these puncturing-points form in the blade of said leaf a multiplicity of apertures, the spaces between which gradually decrease as the leaf approaches the end of a train of wheels, a complete incision, excepting the veins and stem, being formed in said blade when the leaf passes out of contact with the last puncturing device of the series.

The puncturing or perforating points 19 are preferably separated and are laterally yieldable, so that as the leaf is advanced the stem of such leaf, by reason of its rigidity, may enter the space between two adjacent puncturing-points, so as to be beyond the range of action of the ends thereof, which are intended merely to puncture the blade of the leaf, it being essential that the stem should not be materially injured, for the reason that said stem constitutes the main grasping-surface, upon which the belts and other clamping portions of the machine act, and it is therefore necessary to retain in the stem all or nearly all of its native strength in order that it may not break under the strain incident to the removal of the web therefrom.

To assure the entrance of the stem between the shanks of the points 19, each shank is made of resilient or flexible material, so that it may yield slightly when it comes in contact with a stem. When the leaf passes out of contact with two adjacent shanks 20, they, by reason of their resiliency, resume at once their primary positions, and by reason also of the resiliency of the shanks stems of varying sizes can be freely entered between the same without breaking any of the parts.

Suitable means is provided for conducting the leaf to the incising mechanism, said leaf being laid across the carrying mechanism in the condition it is in when detached from a hand or bunch of leaves. The carrying mechanism may consist of a plurality of endless conveyers, which present the leaf to the several sets of devices which successively act upon it, the leaf being usually gripped near its opposite ends just before it reaches the first puncturing device described. A series of parallel belts, constituting a convenient means for the purpose just described, is shown at 25, 26, 27, 28, and 29, respectively, and the upper runs of these belts, upon which the leaf is laid, are in alinement, and all the belts travel in the same direction to advance the leaf to the puncturing mechanism. The belts 25 and 26 are carried at their inner ends by the grooved drum 30, the inner ends of the belts 27, 28, and 29 being passed around a similar but longer drum 31. Said drums are fixed to the transverse shaft 32, supported between the beams 2 and 4. The inner ends of the several carrying-belts are passed around the rolls or drums 33, 34, 35, 36, and 37, the shafts of which are rotatively supported by bearings on the framework. The working or upper runs of the several belts are preferably driven at the same speed, so that the leaf can be squarely advanced after it is placed upon the entering ends of said belts by an attendant, and the surface speeds of the several devices composing the incising mechanism are the same as those of the belts, so that the leaf is not delayed at any point in its traverse through the machine. The belt 25 is a comparatively short one, it being simply long enough to sustain the tip of the leaf until the latter is seized, as will hereinafter appear, by independent means. The belt 26, which forms one of the leaf supporting and carrying parts, continues to the end of the machine. The belts 27, 28, and 29 are of substantially the same length and continue only to the stemming mechanism, as the end of the leaf need not be supported beyond this point. The belt 28 serves as a driving-belt, it moving in the direction of the arrow in Fig. 2, and on its return run engages the driver 38 on the shaft 39 and also passes over a series of idlers, as 40, and said belt serves to operate the other belts of the series to move their working runs in a similar path. The cross-shaft 39 carries a sprocket-wheel 41, connected by the sprocket-chain 42 with the driven sprocket-wheel 43 on the shaft 44, carried by bearings on the framework. The shaft 44 is provided with the gear 45, meshing with the gears 46 and 46' on the shafts 48 and 48', which gears in turn mesh with the pinions 47 and 47'.

The driver 49, if a sprocket-wheel, on the shaft 39 may be connected by a chain, as C, with a suitable main driver, hereinafter described, and being turned in the direction represented will act, through the intermediate mechanism just described, to move the upper runs of the several carrying-belts simultaneously forward.

The belt 26 coöperates with another belt, as 50, the lower run of which is adapted to travel in contact with the upper run of said belt 26 for the greater part of the length of the latter, by reason of which the contiguous runs of said belts can seize the tip of the leaf and carry it through and beyond clamping mechanism running in unison therewith, said clamping mechanism gripping the leaf near where it is held by said belts and while it is passing by the several sets of devices. The belt 50 is supported by the rolls 51 and 52, whose shafts 53 and 54 are carried by suitable brackets on the framework, and said belt also passes over a series of idlers, as 55, the shafts of which are mounted at suitable intervals on the framework, the roll 55' bearing against the upper face of the lower run of the belt 50 near the entering end of the latter, so as to hold it against the upper run of the belt 26, and thus obtain a firm purchase on the leaf. The contiguous runs of the belts 26 and 50 pass between the jaws of leaf-clamping mechanism and beyond the same, whereby they can detach the leaves or tip ends thereof from said clamping mechanism if the leaves should adhere to the latter.

The shaft 54 of the belt 50 is furnished with a gear 56, meshing with a corresponding gear 57 on the shaft 58 of the belt 26, whereby the lower run of the belt 50 can be driven in the proper direction.

The two belts 26 and 50, whose inner ends travel in a corresponding direction and in contact, serve to grip the leaf near its tip, the belt 27, in connection with another belt, operating to hold the leaf nearer its butt, and the different devices which successively act upon the leaf to incise the same before the web is stripped from the stem are situated between these two pairs of belts for operation. For certain purposes it is immaterial whether the leaf be stripped toward the butt or toward the tip, and the leaves can therefore be fed to the machine in positions reverse to that shown and above described, if deemed desirable.

The belt which coöperates with the belt 27 is designated by 60, and the adjacent runs of these two belts travel in contact and the outer or working surfaces thereof are faced with rubber or analogous material, as at 61 and 62, and the lower belt is corrugated longitudinally, by reason of which the stem may be firmly held by said belts.

The belt 60 may be driven as follows: It is passed over the pulleys 63 and 64 on the framework and also around the idlers 55, against which the belt 50 travels and by which it is operated. A rotary motion is imparted to the idlers 55 by the moving belt 50, being transmitted in turn to the belt 60, so that the leaf-clamping runs of the two pairs of belts can be moved in the same direction. The leaf is placed by an attendant upon the inner ends of the parallel feed-belts 25, 26, 27, 28, and 29, which, moving in the direction of the arrows indicated in Fig. 2, conduct said leaf forward until it is seized by the two pairs of belts 26 and 50 and 27 and 60, which preferably clamp the leaf at different points in its length and advance it first to the train of puncturing devices whose peripheries or working surfaces are driven in unison with the said belts. The centers or shafts of the several leaf-puncturing wheels 5 to 10, inclusive, are disposed alternately at opposite sides of the line of feed of the leaf, by reason of which they can be brought into closer relation and so as to prevent the points of the successive wheels from entering the punctures made by a previous wheel, whereby the complete incision of the blade of the leaf is assured. The peripheries of the several puncturing-wheels project across the line of feed of the leaf a sufficient distance to insure their passing entirely through the leaf and without permitting the stem to enter too far in a space between two of the points of a wheel, and said wheels are disposed in alinement, so that their points form in the leaf a multiplicity of alined apertures. The respective puncturing-wheels are reversely movable alternately and operate in unison with the feeding mechanism, and those wheels lying above the plane of feed of the leaf move in one direction, while those wheels below said plane move in the opposite direction, by reason of which each wheel as it operates will impart to a portion of the leaf a slight feed movement, so that said portion of the leaf under treatment cannot lag behind the remainder thereof, as in the latter case the leaf might be torn or otherwise ruined.

The means shown for driving the several puncturing-wheels will be hereinafter described, they being preferably positively driven to insure a better action, although they could be rotated by the advancing leaf.

We prefer to employ in combination with a puncturing device a device which serves to feed and guide and also act upon the leaf adjacent to the place at which it is being perforated, and a series of these devices is preferably employed, each of which embodies working surfaces engaging the leaf at different points in the length and between which surfaces thereof a puncturing device operates. These feeding and guiding devices are designated, respectively, by 70, 71, 72, 73, 74, and 75, and they coöperate and are disposed substantially in vertical line below and above the puncturing-wheels 5, 6, 7, 8, 9, and 10. Each of said devices consists of a pair of separated disks, as 76, fixed to the respective shafts 77, 78, 79, 80, 81, and 82, and the peripheries of these devices are roughened, milled, or toothed to prevent the leaf from slipping as it comes in contact therewith, and said disks project a short distance across the line of feed of the leaf. Said feed and guiding devices are preferably mechanically rotated, although they may be turned by the advancing leaf, and it will be understood that they are situated between the points at which the leaf is clamped. When the leaf comes into engagement with the first device of the series and as said leaf is fed onward, it will be slightly depressed, and thereby placed under tension, so that the points 19 of the first puncturing-wheel can readily pass through the blade of the leaf without tearing it. The first puncturing-wheel of the series forms in the blade of the leaf a multiplicity of alined perforations, this operation being repeated alternately on opposite sides of the leaf by the succeeding wheels, the distance between the punctures gradually decreasing until the leaf leaves the last one of the series, at which time a clean incision will have been formed in the blade, although the stems and veins may not have been broken or otherwise injured.

It will be understood that as each puncturing-wheel acts upon the leaf the latter is tightened by the feeding and guiding devices to which we have referred and is thereby prevented from tearing. As the leaf comes into contact with the puncturing-wheel the stem of said leaf, by reason of its rigidity and the resiliency of the shanks 20, carrying the puncturing-points 21, can be thrust into a space between two adjacent shanks, in virtue of which the stem cannot be reached and injured by said puncturing-points.

The continuous runs of the belts 26 and 50 pass between the fixed and movable jaws 83 and 84, respectively, of a series of clamping devices on the endless carrier C, the said jaws when locked along the upper run serving to hold the leaf under treatment and the carrier preferably moving in synchronism with the two belts. The fixed jaws 83 of the respective clamping devices are secured to the links 85 of a sprocket-chain serving as the carrier which passes around the sprocket-wheels 87 and 88. The working runs of the two belts 26 and 50 which pass between the jaws of the several clamping devices continue beyond the discharging end of said carrier C, so that when the jaws of the clamping devices are successively opened the two contacting belts which grip the leaf can detach the same from a fixed or under jaw in case it should adhere thereto, said jaw generally having a roughened surface. The movable jaws of the series are pivoted, as at 89, to the fixed jaws, respectively, and are locked shut to clamp a leaf by toggle mechanism.

The toggles consist of the links 90 and 91, pivoted to the movable jaws and the chain-links, respectively, the upper link 90 in each case being furnished with a projection, as 92, carrying a roll at its free end. As the several jaws start on the upper or horizontal run of the carrier C the projections 92 successively strike a fixed cam, as 93, on the framework, which forces the several toggle-pivots across a dead-center line, thereby locking the clamping-jaws, and when the clamping-jaws pass toward the lower run of the carrier the arms or projections 92 successively strike a second cam, as 94, also on the framework, (see Fig. 9,) which unlocks the toggles, and consequently permits the jaws to be opened.

The jaws are preferably swung open by coiled springs, as 93', having extensions, as 96 and 97, which act against the respective fixed and stationary jaws, said springs encircling the pivots 89 between the jaws, so that they can be held in place.

The mechanism for advancing the tip end of the leaf has been briefly described, and, as has been stated, this mechanism seizes the leaf just before it is acted upon by the first puncturing-wheel and carries said leaf substantially to the end of the machine.

After the blade of the leaf has passed out of contact with the last puncturing-wheel 10 of the series it has a transverse cut therein, although, as hereinbefore stated, the veins extending across the gap and stem have not been injured. (See Fig. 18.) The veins are severed after the blade is incised and while the leaf is passing by the train of vein-severing devices, which, like the puncturing-wheels, are preferably disposed in alinement. To prevent the severance or cutting of the stem at this stage, the leaf is put under tension, preferably applied at a point just before said leaf reaches the first vein-severing device, a series of these severing devices being preferably employed to insure the parting of all the veins extending across the opening.

We provide means for applying tension to the leaf, preferably longitudinally thereof, so that the stem is stretched very tight and is thereby moved out of the path of the successive vein-severing devices or cutters. To apply the proper amount of tension to said leaf between the points at which it is held by the gripping mechanism, a belt, as 100, against which suitable pressure means act, may be provided, and this belt may be passed around rolls, as 101, and the idlers 55, so that the horizontal run of said belt 100 may move in a path corresponding with that of the other belts hereinbefore described.

The lower or horizontal run of the belt 100 is forced firmly into contact with and preferably into a concavity or depression, as 102, extending throughout the length of the outer surface of the wide belt 27, and it will be evident that when a leaf enters between the two belts it will be sunk by the upper belt into the concavity or depression in the lower belt, due to the pressure applied to the belt 100, by reason of which the stem of the leaf is tightened to such an extent as to prevent its being touched by the vein-cutters.

The working run of the belt 100 is of such a length that the leaf is retained under tension while it is traveling past the vein-severing mechanism, and any suitable means may be employed for forcing said run into the concavity or pocket 102 of the adjacent belt. We have shown for this purpose a series of spring-actuated rollers, as 103, journaled in the carriers 104, which are pivoted, as at 105, to the framing of the machine. The several rolls are forced tightly against the belt 100 by a series of coiled springs, as 106, attached, respectively, to the framework and to the arms 107 of the roll-carriers.

In connection with the vein-severing mechanism we preferably employ means for deflecting or pressing the vein or veins extending across the incision or gap in the leaf by the puncturing mechanism into contact with said vein-severing mechanism, and to prevent the vein-deflecting means from also acting against the stem when the stem and vein are in very close relation we also provide vein and stem spacing mechanism.

To insure the complete cutting of all of the veins, a plurality of vein-deflecting, vein-severing, and stem-spacing devices are used, these being arranged in a train of sets, one device of each kind being in each set.

The devices for separating the stem and veins of the leaf are designated by 110, 111, 112, and 113, and they are carried upon the shafts 114, 115, 116, and 117 and are similar in construction to the puncturing-wheels, although their working portions are disposed in a different plane—that is to say, such working portions of the spacing-wheels are set farther inward than the working portions of the puncturing wheels—so that the former are brought opposite the transverse cut in the leaf, it being evident that the line of incision is shifted when the tension hereinbefore alluded to is applied to said leaf. Each of these spacing-wheels consists of a hub or body portion 118, fixed to its shaft and from which the series of resilient shanks 119 extend, said shanks having the heads 120' pointed or beveled to form the angular guide-faces 121' and 122' at opposite sides thereof.

When a vein of the leaf reaches the first spacing-wheel 110, it will come into contact with one of the angular guide-faces of a spear-head 120' or that spear-head that is on the line of feed, and as the leaf is advanced in unison with the rotation of said wheel said vein will be guided into the space between two adjacent shanks 119 as the wheel rotates, and the stem will be likewise entered between two adjacent points on the wheel when it comes into contact with another point, by reason of which the arms or shanks 119 serve to hold the vein and stem apart, whereby the vein can be pressed by a vein-deflecting device beyond the plane of the stem and into contact with a vein-cutter.

The primary vein-deflecting devices are designated, respectively, by 120 and 121, they being yieldingly mounted, so that when struck by the stem of the leaf they give slightly and will not abrade said stem. Each of the vein-deflecting devices is in the form of a toothed wheel, the teeth being designated by 122 and 123 and having the pockets or concavities 124 and 125 at their outer ends for a purpose that will hereinafter appear. These vein-deflecting devices are journaled to the pivoted carriers 126 and 127, respectively, and to the arms 128 and 129 of said carriers the springs 130 and 131 are connected, said springs being also attached to the framework and said carriers are held against the stops or set-screws 132 and 133, respectively.

The vein-severing devices which coöperate with the respective vein-deflecting devices 120 and 121 consist in the present case of saws the direction of rotation of which is indicated by the arrows, although any suitable form of cutter may be employed.

The several vein-severing devices or cutters, which are situated, respectively, between the spacing-wheels and vein-deflecting devices, are designated by 150, 151, 152, and 153, their arbors being supported by the framework, said cutters being driven in a direction reverse to that of the several spacing-wheels, so as to clip the veins as the latter touch the cutters. As the leaf is carried forward by the feeding mechanism the veins and the stem will be separated and held apart, as described, by the first spacing-wheel of the series, and the leading vein will pass into a pocket 124 on a tooth 122 of the deflecting-wheel 120, or that tooth which is in line with the path of the leaf, said teeth being set closely together to insure this result. As the leaf moves forward the vein is operable to turn the deflecting-wheel, so that the end of that tooth in which the leading vein is situated will be raised to force said vein against the periphery of the cutter 150, thereby to sever said vein, and a second tooth on the opposite side of the wheel will similarly seek out and force a second vein into contact with the cutter. The spaces between the tooth-deflecting wheel, while quite narrow, are preferably wide enough to accommodate the stem of the leaf as it travels past the same. Two or more veins having been severed, the leaf is advanced to the second set of devices for further treatment, except that the vein-deflector 121 depresses the vein below the plane of feed of the leaf into contact with the cutter 151.

In tobacco-leaves a series of four veins sometimes crosses the incision made into the middle of the leaf and they extend diagonally from the stem, two veins in this case being situated at each side of the stem, and it is found in practice that all of these veins are generally cut by the primary set of severing devices. It happens, however, occasionally that the leading vein lies very close to and below and consequently out of the path of said primary severing devices, in which case a second set of vein-deflecting devices or wheels of slightly different construction than those previously described is employed to meet the contingency pointed out.

The secondary vein-deflecting devices are designated by 155 and 156 and they coöperate, respectively, with the spacing-wheels 112 and 113 and the saws 152 and 153. The teeth of the deflecting-wheels 155 and 156 and the pockets therein, together with the carrying mechanism therefor, are designated by the same characters applied to corresponding parts in the primary vein-deflecting wheels.

It will be observed that the teeth of the deflecting-wheels 155 and 156 are of irregular shape and that in addition to having concavities in their outer faces they are equipped with hooks or toes, as 157.

When the leaf reaches the third vein and stem spacing wheel of the series, the vein, should there be one close to the stem, will enter, together with the stem, into a space between two of the points of said wheel as the latter rotates during the feed of the leaf. The vein-deflecting wheel being rotative and yieldingly mounted will recede slightly as the stem comes in contact therewith, and said stem, with the vein, can enter the space between two adjacent teeth of the vein-deflecting wheel when opposite said space, and as the leaf is fed forward the deflecting-wheel will be caused to rotate thereby, and the hook of the stem-straddling tooth will seek out the vein and force it into contact with the cutter 152. Should said vein lie near and over the stem on the opposite side of the latter and still remain uncut, the vein-deflector 156 or straddling tooth will force the vein against the cutter 153 in a manner similar to the wheel 155; but the stem being under high tension will not be pressed against said cutter.

It is important that the web or lamina of the leaf should be first incised before the veins are severed, for, as is obvious, if it were attempted to sever all parts of said web or lamina simultaneously any means of sufficient power to press the web and veins upon the dividing knives or saws would in all probability force the stem against the saws with sufficient pressure to sever the same. Therefore by incising the web or lamina first it takes much less pressure to force the veins into contact with the severing-saws, and this light pressure, even if exerted upon the stem, (which, as above stated, is under tension,) is insufficient to press it into engagement with said saws. This result is important in a machine of the class described, as the stem is the means chiefly relied upon to resist the power of the stripping operation, and if such stem were severed or materially injured it is obvious that the leaf would be free to be fed through the stripping-rolls without having the web or lamina stripped from said stem.

The shafts 47 and 47' carry the pulleys 167 and 168, respectively, which serve to operate the several leaf-treating devices.

A belt is represented at 169 passed around the pulley 167, and it runs in contact with the pulleys 171, secured to several of the leaf-treating devices, a similar belt 172 being passed around the pulleys 172', secured to the remainder of said shafts, and also around the pulley 168. The two belts also engage the pairs of idlers 168' and 168" at opposite sides of the shaft 44. The belts are so placed on the several pulleys as to secure the motion of the different leaf-treating devices in the proper direction.

The shafts 150', 151', 152', and 153' carry gears, (designated, respectively, by 190,) meshing with coöperative gears 191, respectively secured to the several shafts 191' on the framing of the machine, each of said shafts carrying a sheave, as 192. The several sheaves are driven by the belt 193, passed around the same and also around a series of fixed and idle pulleys 194 and 195, respectively, the belt being so placed on the several sheaves and pulleys as to secure the rotation of the cutters in the directions indicated by the arrows in Fig. 7. After the leaf has passed the saw or cutter 153 a complete incision will have been formed transversely in the web thereof, and as it is carried beyond this point the part of the web lying between the line of incision and the butt or large end of the leaf is removed. For detaching the portion of the leaf just mentioned we prefer to employ the ordinary superposed stemming-rolls, such as A and B, diagonally disposed to the path of the leaves. These rolls consist, as usual, of a wooden core or other body and card-clothing or similar material wound on the same, the cloth of the two rolls intermeshing, as is customary. The shafts 175 and 176 of the two rolls are supported by suitable bearings on the framing. The entrant end of said rolls is in proximity to the place at which the leaf emerges from the incising mechanism, and the line of contact of said rolls is substantially coincident with the path of the leaf, so that the latter can be fed straight through the rolls, the latter as they reversely rotate wiping or brushing the web from the stem as the leaf advances, the separated web, which is in two pieces, falling from the rolls into a suitable receptacle.

The shafts 175 and 176 of the stemming-rolls A and B carry the meshing gear-wheels 180 and 181, respectively, and the shaft 175 is provided with a pulley 182, which may be connected by a belt with a suitable driver, the construction described constituting a convenient means for reversely rotating the two stemming-rolls.

After the web is separated the partially-stemmed leaf is carried forward, and during this stage the stripped stem is cut close to the non-separated portion of the leaf, and any convenient form of device may be employed for thus cutting the stem, although a device operating by a shearing cut is preferred. One form of cutter for this purpose is designated by 177, and it is mounted on the framework for rotation, it being in the form of a disk and having a beveled cutting edge, which touches the flat surface of a disk 178, pivotally mounted on the framework or a bracket thereon. The point of contact between these two parts coincides with the path of the leaf, so that the stem can be carried between the peripheries of the two disks, the cutter severing said stem, which drops to be disposed of in the usual manner. The non-separated portion of the leaf, or that part around its tip, is then advanced until the belts 26 and 50 detach such portion from a pair of clamping-jaws, said portion of the leaf being discharged at the extreme outer end of the two belts 26 and 50.

The operation of the hereinbefore-described machine is as follows: The leaf is placed upon the working runs of the feed-belts 25, 26, 27, 28, and 29, which conduct the same to the puncturing mechanism, consisting of the wheels 5, 6, 7, 8, 9, and 10, which form transversely in the leaf a multiplicity of alined perforations or apertures, the distances between the same gradually decreasing as the leaf approaches the last puncturing-wheel of the series. When the leaf passes beyond the last puncturing-wheel, a transverse incision will have been produced in the blade or lamina thereof. The leaf is then conducted to the vein-deflecting and vein-severing devices, heretofore described, the vein-severing devices serving to cut the veins lying across the transverse incision in the leaf. When the leaf passes beyond the last cutter 153 of the series, a transverse incision or gap will have been formed in the web, extending oppositely from the stem. The leaf is then fed forward with its end between the surfaces of the stemming-rolls A and B, which detach that part of the web lying between the incision and the end of the leaf. At a point slightly beyond this stage the stem is carried against the cutter 177, which severs the same close to the non-separated portion of the leaf, said cut portion of the stem dropping. The non-separated portion is then advanced to the discharging end of the carrying mechanism.

In Figs. 17 to 23 I have illustrated a leaf as it comes from the hand and the successive operations performed on said leaf. *a* represents the leaf as it comes from the hand, and *b*, *c*, *d*, *e*, *f*, and *g* show it after it has received the successive treatments. Said leaf is first punctured transversely to form a multiplicity of incisions. The veins lying across the incision are then cut, the web then being detached and the stem severed to produce three merchantable pieces of leaf, as indicated at *g*, Fig. 23.

We have illustrated and hereinbefore described efficient means for treating a tobacco-leaf in accordance with our invention; but we do not limit said invention to the employment of such means, nor to any particular mechanism, such as that hereinbefore set forth, for operating the several devices which successively act on the leaf, for other means clearly within the scope of our invention might be substituted therefor and the same advantageous results be secured.

Having described our invention, we claim—

1. Leaf-stemming devices comprising means for first transversely incising the web of a leaf, and, second, for detaching that part of the web located between the line of incision and the end of the leaf.

2. In a leaf-stemming machine, the combination of means for transversely incising the web of a leaf; means for detaching that part of the web located between the line of incision and the end of the leaf; and means for feeding said leaf.

3. In a leaf-stemming machine, the combination of automatic mechanism for transversely incising the web of a leaf, and for detaching that part of the web located between the line of incision and the butt of the leaf.

4. In a leaf-stemming machine, the combination of means for transversely incising the web of a leaf; means for detaching that part of the web located between the line of incision and the end of the leaf; and means for severing the stem.

5. The combination, with means for first transversely incising the web of a leaf, of means for detaching that part of the web located between the line of incision and the end of the leaf, and means for engaging the leaf near its opposite ends and for carrying it through the machine.

6. The combination, with means for first transversely incising the web of a leaf, of means for detaching that part of the web located between the line of incision and the end of the leaf, and means for gripping said leaf near its opposite ends and for advancing it for treatment.

7. The combination, with a device for transversely incising the web of a leaf, of means for feeding the leaf, and means for stripping the leaf from the stem.

8. The combination, with means for transversely incising the web of a leaf, of means for carrying the leaf past the incising means, and stemming mechanism diagonally disposed to the line of feed of the leaf.

9. The combination, with means for transversely incising the web of a leaf, of stemming mechanism diagonally disposed to the line of feed of the leaf, the entrant end of the stemming mechanism being situated in proximity to the point at which the leaf emerges from the incising means.

10. The combination, with means for transversely incising the web of a leaf, of means for carrying the leaf, and stemming mechanism consisting of a series of superposed stemming-rolls the entrant ends of which are in proximity to the point at which the leaf emerges from the incising mechanism.

11. In a machine of the class specified, the combination of yielding devices for forming in the web of the leaf punctures or apertures to produce an incision therein, and means for stripping the leaf.

12. In a machine of the class specified, the combination of means for forming in the web of a leaf punctures or apertures to produce an incision therein, and means for severing the veins lying across said incision.

13. In a machine of the class specified, the combination of yielding devices for forming transversely in the web of a leaf punctures or apertures to produce an incision therein; means for deflecting and severing the veins lying across said incision; and means for stripping the leaf.

14. In a machine of the class specified, the combination of means for forming transversely in the blade of a leaf punctures or apertures to produce an incision therein; means for severing the veins lying across the incision; and means for detaching the web lying between the incision and one end of the leaf.

15. In a machine of the class specified, the combination of means for forming transversely in the blade of the leaf punctures or apertures to produce an incision therein; means for severing the veins lying across the incision; and means for detaching that part of the web located between the line of incision and the butt of the leaf.

16. In a machine of the class specified, the combination of means for forming in the blade of a leaf punctures or apertures to produce an incision in said blade; means for deflecting the vein or veins lying across the incision; and means for severing the veins thus deflected.

17. The combination, with means for transversely incising the web of a leaf, of means for detaching that part of the web located between the line of incision and the butt of the leaf; and means for cutting the stem close to the non-separated portion of the leaf.

18. The combination, with means for transversely incising the web of a leaf, of means for detaching that part of the web located between the line of incision and one end of the leaf, and means supported independent of the web-detaching means for cutting the stem after such portion of the web is removed.

19. A leaf-puncturing device comprising a body portion, a series of resilient shanks secured to the body portion, and a corresponding series of heads having inclined edges fixed to the respective shanks.

20. A leaf-puncturing wheel comprising a hub and a series of resilient separated points having inclined edges secured to, and projecting radially from, said hub.

21. The combination, with leaf puncturing and carrying means, of a device having two separated working surfaces between which the puncturing means is disposed.

22. The combination, with leaf puncturing and carrying means, of a device consisting of two separated parts between which the puncturing means is disposed.

23. The combination, with leaf puncturing and carrying means, of a device having two separated working surfaces between which the puncturing means is disposed said device projecting across the line of feed of the leaf.

24. The combination, with leaf puncturing and carrying means, of a rotary device having two separated working surfaces between which the puncturing means is disposed.

25. The combination, with two shafts provided, respectively, with a leaf-puncturing device and a leaf guiding and feeding device, the latter consisting of two disks between which the puncturing device is disposed, of means for carrying a leaf past said puncturing device.

26. The combination, with rotary leaf-puncturing means, of means for carrying the leaf past the puncturing means, and a rotary device for guiding and feeding the leaf while it is being punctured, said device projecting across the line of feed and having two separated working surfaces between which the puncturing means is disposed.

27. In a leaf-stemming machine, the combination, with means for feeding the leaf, of a series of movable puncturing devices for transversely incising said leaf, the puncturing devices moving at the same speed and in the same direction as the advancing leaf.

28. The combination, with leaf-carrying means, of a series of leaf-puncturing devices disposed alternately at opposite sides of the line of feed.

29. The combination, with leaf-carrying means, of a series of leaf-puncturing devices disposed alternately at opposite sides of the line of feed, and means for operating said puncturing devices.

30. The combination, with leaf-carrying means, of a series of rotary leaf-puncturing devices disposed alternately at opposite sides of the line of feed, and means for oppositely rotating said puncturing devices.

31. In a machine of the class specified, the combination, with leaf-carrying belts, of a leaf-puncturing device; a movable clamp for gripping the leaf near one end thereof; and a movable clamping device for gripping the leaf at another point in its length.

32. In a machine of the class specified, the combination, with leaf-carrying belts, of a leaf-puncturing device, and a leaf feeding and guiding device having two separated working surfaces, both of said devices being located in and projecting across the line of feed of the leaf.

33. In a machine of the class specified, the combination, with leaf-carrying belts, of means for incising the leaf; means for severing the veins of said leaf; and means for stripping the leaf.

34. In a machine of the class specified, the combination, with leaf-carrying belts, of means for incising the leaf; means for severing the veins of said leaf; means for stripping the leaf; and means for severing the stem of the leaf.

35. In a machine of the class specified, the combination, with leaf feeding and clamping belts, of a clamp movable in unison with said belts and serving to grasp the leaf near one end thereof; a leaf-incising device; a vein-severing device; and a leaf-stripping device.

36. In a machine of the class specified, the combination, with leaf-feeding means, of a leaf-incising device; a vein-severing device; and a device coöperating with said vein-severing device and adapted to seek out and to force a vein or veins into contact with the vein-severing device.

37. The combination, with means for incising the blade of a leaf, of a vein-severing device; means for forcing the vein or veins lying across the incision into contact with said severing device; and means for carrying the leaf.

38. The combination, with leaf-carrying means, of means for forming in the leaf a multiplicity of punctures to produce an incision; a vein-severing device; and a toothed vein-deflecting device disposed in the path of movement of the leaf, the respective teeth of said device being constructed to receive a vein and to force it into contact with the vein-severing device.

39. The combination, with leaf-carrying means, of means for forming in the leaf a multiplicity of punctures to produce an incision; a vein-severing device; and a toothed vein-deflecting device disposed in the path of movement of the leaf, the respective teeth of said device having pockets at their outer ends.

40. The combination, with leaf-carrying means, of means for forming in the leaf a multiplicity of punctures to produce an incision; a vein-severing device; and a rotary toothed vein-deflecting device disposed in the path of movement of the leaf, the respective teeth of said device being constructed to receive a vein and force it into contact with the vein-severing device as said vein-deflecting device rotates.

41. The combination, with leaf-carrying means, of means for forming in the leaf a multiplicity of punctures to produce an incision; a vein-severing device; and a yieldingly-mounted, vein-deflecting device disposed in the path of movement of the leaf and constructed to receive and force a vein into contact with the vein-severing device.

42. The combination, with leaf-carrying means, of means for forming in the leaf a series of punctures to produce an incision; a vein-severing device; and a rotative device disposed in the path of movement of the leaf and constructed to receive and force a vein into contact with the vein-severing device.

43. The combination, with leaf-carrying means, of means for forming in the leaf a series of punctures to produce an incision; a yieldingly-mounted vein-severing device; and a device disposed in the path of movement of the leaf and constructed to receive and force a vein into contact with the vein-severing device.

44. The combination, with leaf-carrying means, of means for forming in the leaf a multiplicity of punctures to produce an incision; a vein-severing device; and a toothed vein-deflecting device disposed in the path of movement of the leaf, the teeth of said device being of irregular shape and having hooks.

45. The combination, with means for incising the blade of a leaf, of a vein-severing device; a device for separating the veins and stem lying across the incision; and means for forcing the vein or veins into contact with the vein-severing device.

46. The combination, with means for incising a leaf, of a vein-severing device; a rotary device for separating the veins and stem; and means for forcing the vein or veins lying across the incision into contact with said vein-severing device.

47. The combination, with leaf-carrying means, of means for incising the blade of a leaf; a vein-severing device; a movable member projecting across the line of feed and operable for separating the vein and stem extending across the incision; and means for forcing said vein or veins into contact with the severing device.

48. The combination, with leaf-carrying means, of means for incising the blade of a leaf; a vein-severing device; a device projecting across the line of feed and having a plurality of resilient spacing-arms serving to separate the veins and stem as the leaf is fed forward; and means for forcing said vein or veins projecting across the incision into contact with said severing device.

49. In a leaf-stemming machine, a device for separating the veins and stem of a leaf lying across an incision previously made therein, said device comprising a body portion and a series of resilient arms.

50. A leaf-stemming machine embodying a device for separating the veins and stems of a leaf lying across an incision previously made therein and comprising a body portion, and a series of resilient arms having angular guide-faces at their outer ends.

51. The combination, with leaf-carrying means, of means for forming in the leaf a multiplicity of punctures to produce an incision; a device for severing the veins lying across said incision; and means for applying tension to the leaf before said leaf reaches the vein-severing device.

52. The combination, with leaf-carrying means, of means for forming in the leaf a multiplicity of punctures to produce an incision; a device for separating the vein and stem lying across said incision and having its working portion disposed in a different plane from the working portion of the incising mechanism; and means for applying tension to the leaf before said leaf reaches the vein-severing device.

53. The combination, with leaf-carrying means, of means for forming in the leaf a multiplicity of punctures to produce an incision; a device for severing the veins lying across said incision; and means acting against the leaf-carrying means to apply tension to the leaf before said leaf reaches the vein-severing device.

54. The combination, with leaf-carrying means, of means for forming in the blade of the leaf a transverse incision; a device for severing the veins lying across said incision; and means for applying tension to the leaf before the said leaf reaches the vein-severing device.

55. The combination, with leaf-carrying means, of means for forming a transverse incision in the blade of the leaf; a device for severing the veins lying across said incision; and spring-actuated means for applying tension to the leaf before said leaf reaches the vein-severing device.

56. The combination, with means for forming in the blade of a leaf a transverse incision, of a device for severing the veins lying across said incision; a plurality of belts whose contiguous runs travel in contact and operate to seize and advance the leaf past said incising means; and means for applying tension to one of the belts.

57. The combination, with means for forming in the blade of a leaf a transverse incision, of a device for severing the veins lying across said incision; a plurality of belts whose contiguous runs travel in contact for carrying the leaf past the incising means, one of said belts having an elongated concavity; and pressure means acting against the other belt.

58. The combination, with a series of devices disposed in a train and operable first for forming a multiplicity of incisions transversely in the blade of a leaf to produce an incision and then for severing the veins lying across the incision, of means for conducting the leaf past said devices for treatment; mechanism for removing that part of the web located between the line of incision and one end of the leaf; and means for severing the stem after said body portion of the web is detached.

59. In a machine for stemming tobacco-leaves, the combination, with a conveyer, of a leaf-incisor located and adapted for operating upon the leafy portion of the leaf; means for deflecting the veins of the incised leaf; a vein-severer located to operate in conjunction with the vein-deflecting means; a stem-stripper located beyond the leaf-incisor and vein-severer; and means for conveying the incised leaf to the stem-stripper.

60. In a machine of the class specified, the combination, with means for transversely incising the leaf, of means for applying tension to the leaf, and means for severing the veins of the leaf.

61. In a machine of the class specified, the combination, with means for advancing the leaf, of means for incising the leaf; means for applying tension to the leaf; means for severing the veins; and means for stripping the leaf.

62. In a machine of the class specified, the combination, with yielding means for transversely incising the web of the leaf, of means for applying tension to the leaf; yielding means for severing the veins of the leaf; and means for stripping the leaf.

63. In a machine of the class specified, the combination, with leaf-feeding devices, of a series of movable puncturing devices; means for applying tension to the leaf; and means for severing the veins of the leaf.

64. In a machine of the class specified, the combination, with leaf-feeding devices, of a series of movable puncturing devices; means for applying tension to the leaf; means for severing the veins of the leaf; and means for stripping the leaf.

65. In a machine of the class specified, the combination, with leaf-feeding devices, of a series of movable puncturing devices; means for applying tension to the leaf; means for severing the veins of the leaf; means for stripping the leaf; and means for severing the stem of the leaf.

66. In a machine of the class specified, the combination, with means for incising the leaf, of belt mechanism for feeding the leaf and applying tension thereto, and means for severing a vein or veins while said leaf is under tension.

67. In a machine of the class specified, the combination, with means for incising the leaf, of belt mechanism for feeding the leaf and applying tension thereto; a device for severing a vein or veins while said leaf is under tension; and means for deflecting and pressing the vein or veins of the leaf extending across the incision into contact with the vein-severing device.

68. In a machine of the class specified, the combination, with means for advancing the leaf, of a feeding and guiding device consisting of a pair of separated disks having roughened peripheries, and a puncturing device coöperating with said disks.

69. In a machine of the class specified, the combination, with leaf feeding and clamping devices, of a series of feeding and guiding devices, each of said devices consisting of a pair of separated disks having roughened peripheries, and a series of puncturing-wheels coöperating with said devices.

70. In a machine of the class specified, the combination, with leaf-feeding devices, of a pair of separated disks having roughened peripheries; means for rotating said disks; and a puncturing-wheel having teeth for puncturing the leaf as it is carried past said disks.

71. In a machine of the class specified, the combination, with leaf-carrying devices, of a pair of separated disks having roughened peripheries, said disks projecting across the line of feed of the leaf, a puncturing-wheel having teeth also projecting across the line of feed of the leaf; and means for rotating said disks and said wheel.

72. In a machine of the class specified, the combination, with means for advancing the leaf, of a pair of separated disks having roughened peripheries; puncturing devices coöperating with said disks; and means for applying tension to the leaf as it is advanced past said devices.

73. In a machine of the class specified, the combination, with means for advancing the leaf, of means for puncturing the same; means for applying tension to the leaf; and means for severing the veins of said leaf.

74. In a machine of the class specified, the combination, with means for advancing the leaf, of vein-severing mechanism, and leaf-stripping mechanism.

75. In a machine of the class specified, the combination, with means for advancing the leaf, of a series of vein-deflecting and vein-severing devices, and means for stripping the leaf.

76. In a machine of the class specified, the combination, with means for advancing the leaf; of means for incising the leaf; spacing devices; vein-severing devices; and leaf-stripping devices.

77. In a machine of the class specified, the combination, with means for advancing the leaf, of a spacing-wheel having a series of teeth, and vein-deflecting and vein-severing devices coöperating with said spacing-wheel.

78. In a machine of the class specified, the combination, with vein-severing devices, of spacing-wheels, and vein-deflecting devices.

79. In a machine of the class specified, the combination, with yielding vein-severing devices, of spacing-wheels, and vein-deflecting devices.

80. In a machine of the class specified, the combination, with means for advancing the leaf, of a series of spacing devices; a vein-deflecting device; and a vein-severing device.

81. In a machine of the class specified, the combination, with a spacing-wheel having a series of yielding teeth, of a vein-deflecting wheel having a series of pockets, and a vein-severing cutter.

82. In a machine of the class specified, the combination, with a spacing-wheel having a series of yielding teeth, of a vein-deflecting wheel having a series of pockets and having teeth of irregular shape; and a vein-severing device.

83. In a machine of the class specified, the combination, with a vein-deflecting wheel having teeth of irregular shape, each tooth having a concavity in its outer face, of a vein-severing device coöperating with said wheel.

84. In a machine of the class specified, the combination, with a vein-deflecting wheel having teeth of irregular shape and a series of pockets between said teeth, each of said teeth having a concavity in its outer face and being equipped with a hook or toe, of a vein-severing cutter coöperative with said wheel.

85. In a machine of the class specified, the combination, with a series of vein-deflecting wheels having teeth each having a concavity in its outer end, of a series of yieldingly-mounted vein-severing devices coöperative with said wheels.

86. In a machine of the class specified, the combination, with a series of vein-deflecting devices each device of the series being equipped with yielding teeth having angular faces, of a series of vein-deflecting devices having teeth with concavities in their ends, and a series of yieldingly-mounted vein-separating cutters coöperative with said deflecting devices.

87. In a machine of the class specified, the combination, with a series of feed-belts upon which the leaf is placed, of a tension clamping-belt coöperative with one of said belts; means for clamping the leaf near one of its ends; means for incising the leaf; and means for stripping the leaf.

88. In a machine of the class specified, the combination, with a series of leaf-carrying belts, of means for transversely incising the web of a leaf; means for severing the veins left intact by the incising operation; and a series of spring-pressed rollers for applying pressure to the leaf, while it is being advanced by the belts, to thereby place said leaf under tension.

89. The combination, with a series of leaf-carrying belts, one of which has a longitudinal concavity, of a tension clamping-belt; means for grasping the leaf near one of its ends; leaf-incising means; vein-severing means; and a series of spring-pressed rollers for applying pressure to said clamping-belt during the vein-severing operation.

GEORGE P. BUTLER.
WILLIAM H. BUTLER.

Witnesses:
F. H. RICHARDS,
FRED. J. DOLE.